United States Patent [19]
Taylor et al.
[11] 3,917,903
[45] Nov. 4, 1975

[54] DETACHABLE PICKUP ARM MAGNETIC COUPLING

[75] Inventors: Byron Kent Taylor; William Henry Carlin, both of Indianapolis, Ind.

[73] Assignee: RCA Corporation, New York, N.Y.

[22] Filed: Nov. 12, 1974

[21] Appl. No.: 522,822

[52] U.S. Cl. ..... 178/6.6 R; 178/6.6 DD; 178/6.6 P; 179/100.1 B; 179/100.41 G; 274/37
[51] Int. Cl.$^2$ ..... H04N 5/76
[58] Field of Search ..... 178/6.6 R, 6.6 A, 6.6 DD, 178/6.6 P; 179/100.4 R, 100.4 M, 100.41 G, 100.41 R, 100.1 B; 274/23 R, 23 A, 37; 360/77, 78, 86, 97, 99, 104, 105, 106

[56] References Cited

UNITED STATES PATENTS

| | | | |
|---|---|---|---|
| 3,245,084 | 4/1966 | Kuyt | 274/37 |
| 3,495,838 | 2/1970 | Zimmermann | 274/37 |
| 3,843,846 | 10/1974 | Miller | 179/100.1 B |
| 3,872,240 | 3/1975 | Carlson et al. | 178/6.6 R |
| 3,873,762 | 3/1975 | Taylor | 178/6.6 A |
| 3,873,783 | 3/1975 | Leedom | 179/100.4 R |
| 3,882,267 | 5/1975 | Leedom | 179/100.1 B |

*Primary Examiner*—Raymond F. Cardillo, Jr.
*Attorney, Agent, or Firm*—Eugene M. Whitacre; William H. Meagher; Dilip A. Kulkarni

[57] ABSTRACT

A coupler is secured to one end of the pickup arm carrying a signal pickup at the other end thereof. The coupler has a portion which comprises magnetized material. A support member is secured to a disc record player supporting structure which is subject to translatory motion along the longitudinal axis of the pickup arm during playback. The support member has a portion which comprises magnetizable material which is subject to releasable engagement with the coupler magnetized portion when the coupling is in a docked condition. Guide means are provided for prohibiting any rotational motion of the pickup arm coupler about (1) a first axis substantially normal to, and (2) a second axis substantially in registry with, the pickup arm longitudinal axis. The coupling rigidly transmits the translatory motion and maintains a specified attitude of the signal pickup in the disc record spiral groove during playback when it is in the docked condition.

4 Claims, 6 Drawing Figures

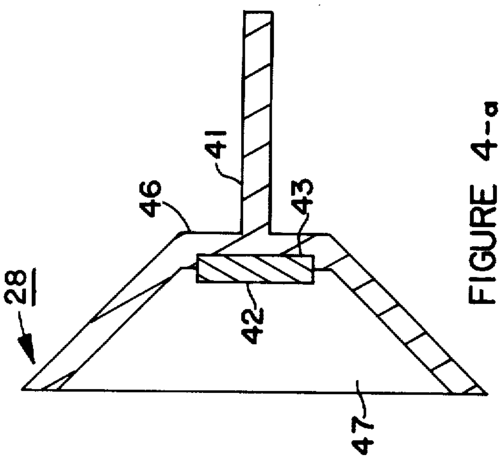
FIGURE 4-a
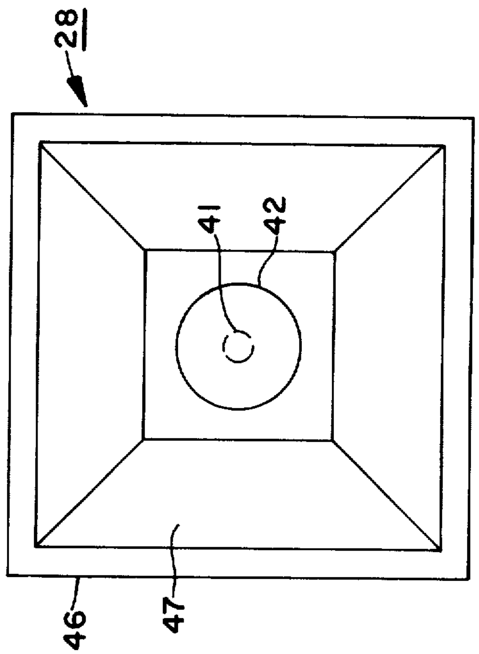
FIGURE 4-b
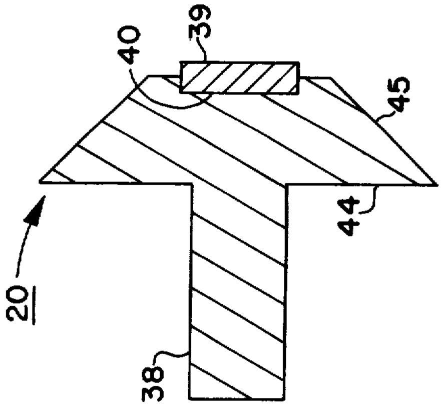
FIGURE 3-a
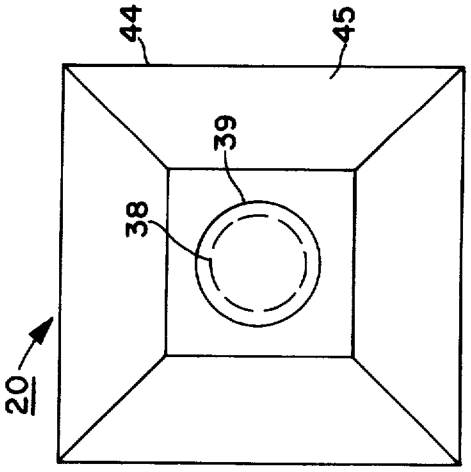
FIGURE 3-b

DETACHABLE PICKUP ARM MAGNETIC COUPLING

The present invention generally relates to video disc record players. More particularly, the present invention relates to a pickup arm coupling which during playback (1) rigidly transmits the translatory motion to the pickup arm, and (2) maintains a specific attitude of the signal pickup in the disc record spiral groove, and yet permits a simple disconnection and connection between the pickup arm and the player supporting structure, whereby unskilled consumer replacement of the replaceable pickup arm unit becomes practical.

BACKGROUND OF THE INVENTION

In certain video disc systems video information is recorded by means of geometric variations in the bottom of a smooth spiral groove on the surface of a disc record. The disc record surface includes a coating of conductive material which is preferably covered with a thin deposit of dielectric material. A signal pickup, supported by a pickup arm, engages the spiral groove and includes a conductive electrode which establishes a capacitance with the conductive coating and the dielectric deposit of the disc record. When the disc record is rotated, the electrode/disc capacitance varies in response to the geometric variations in the bottom of the spiral groove passing beneath. The capacitance variations are converted to electrical variations by a suitable signal processing circuitry coupled to the signal pickup electrode. The output signal of the signal processing circuitry may be coupled to a conventional television receiver for reproduction. The other end of the pickup arm is releasably secured by a coupler to a support member of a supporting structure of the playback system. A system of the aforementioned type is described in detail in the U.S. Pat. NO. 3,842,194, issued on Oct. 15, 1974, to J. K. Clemens.

Video disc systems of the aforementioned type generally utilize disc records having groove densities in the order of four to eight thousand groove convolutions per inch. A typical video disc record of this type may have a groove convolution spacing in the order of 3.5 microns. The fragile walls of relatively narrow grooves of the disc record cannot be dependably relied upon to pull the weight of the pickup arm assembly, around the pickup arm pivot support, across the entire recorded surface of the disc record. Also, in video disc systems utilizing the variable capacitor concept, it is desirable for accurate reproduction of the prerecorded signals that the signal pickup electrode maintain a specified attitude in the spiral groove. In other words, the position and the angular orientation of the signal pickup electrode, in relation to the information track in the spiral groove, must be held in relatively constant. Therefore, the supporting structure includes a radial feed drive mechanism for traversing the supported end of the pickup arm in proper time relationship with the radial motion of the signal pickup tip engaged in the spiral groove so as to continuously maintain the longitudinal axis of the pickup arm substantially tangential to the spiral groove at the point of engagement. Reference may be made to the copending U.S. Application of F. R. Stave, Ser. No. 351,600, filed Apr. 16, 1973, now U.S. Pat. No. 3,870,835 and entitled, "VIDEO DISC PLAYBACK APPARATUS," for an illustration of a suitable radial feed drive mechanism for providing the indicated radial motion.

In addition to traversing the supported end of the pickup arm, it is desirable to prohibit any rotation of the pickup arm coupler about (1) a first axis substantially normal to, and (2) a second axis substantially in registry with, the pickup arm longitudinal axis, in order to maintain the specified attitude of the signal pickup electrode in the spiral groove during playback.

Further, in the above-mentioned type video disc systems it has been recognized that the relative motion between the disc record and the signal pickup must be maintained at a predetermined speed, and within specified tolerance limits (e.g., 450 rpm, ±0.01 percent), in order to obtain high fidelity of reproduction of the prerecorded signals. The predetermined speed and the specified tolerance limits are also necessary to assure that the horizontal and vertical synchronizing information is stable and within the lockup range of the deflection circuits of the television receiver. Moreover, when the prerecorded information is a color television signal with chrominance information recorded as a modulated carrier signal, the recovered signal must be stable and within the lockup range of the color processing circuits of the playback system in order to reduce color phase distortion.

The disc record/signal pickup relative speed may be maintained at the predetermined speed, and within the specified tolerance limits by rendering the pickup arm support member subject to cyclical, translatory motion along the longitudinal axis of the pickup arm in a manner that opposes deviations of the instantaneous relative speed from the predetermined speed. Illustratively, the means for imparting translatory motion to the support member may be of the type disclosed in the U.S. Pat. No. 3,711,641, issued to R. C. Palmer on Jan. 16, 1973, entitled, "VELOCITY ADJUSTING SYSTEM." For satisfactory operation of the translatory motion imparting means of the above type, the motion imparted to the support member must be rigidly transmitted to the signal pickup substantially with minimum phase lag at the deviation frequencies (e.g., at and above once-around frequency of 7.5 cps at record rotation speed of 450 rpm). Therefore, it is desirable that the coupling between the support member and the pickup arm be relatively rigid along the longitudinal axis of the pickup arm.

Further, in the aforementioned type video disc systems the pickup arm and the signal pickup may desirably be treated as a replaceable unit of a size convenient to handle, whereby when the signal pickup wear calls for a replacement, the disc record player user may readily remove and replace the pickup arm/signal pickup unit without requirements for mechanical skill and manual dexterity. A replaceable unit arrangement may be desirable for several reasons. First, the replacement of the pickup arm/signal pickup unit would require no electrical wiring disconnections and connections between the signal pickup electrode and the conductive pickup arm. Second, achievement of a proper attitude for the signal pickup in its playing position may readily be established, and not left to dependence on the skill and knowledge of the user during replacement. Third, the replacement of the fragile and miniature signal pickup (e.g., the signal pickup with 2 microns, the signal pickup depth 5 microns, and the signal pickup electrode depth 0.2 microns) would be rendered practical. Reference may be made to the copending U.S.

application of J. A. Allen, Ser. No. 522,821 filed Nov. 12, 1974 and entitled, "PICKUP ARM CARTRIDGE APPARATUS," for an illustration of a suitable replaceable unit.

It is therefore advantageous to provide a coupling which permits a simple disconnection and connection between the pickup arm unit and the supporting member, whereby unskilled consumer replacement of the pickup arm unit becomes practical.

SUMMARY OF THE INVENTION

A detachable pickup magnetic coupling comprises a support member fixedly secured to a disc record player supporting structure which is subject to translatory motion during playback substantially along the longitudinal axis of a pickup arm carrying a signal pickup at one end. A first magnetic coupling element of magnetizable material is secured to the support member. A coupler is secured to the pickup arm at the other end. The coupler includes a second magnetic coupling element of magnetizable material which is subject to releasable engagement with the first magnetic coupling element when the coupling is in an assembled condition. At least one of the first and second magnetic coupling elements is permanently magnetized. The engagement of the first and second magnetic elements permits rigid transmission of the longitudinal motion of the support member to the pickup arm via the coupler during playback when the coupling is in the assembled condition. Guide means are secured to the support member and the coupler, (1) for establishing a rotational orientation of the pickup arm during engagement of the coupling elements, and (2) for prohibiting any rotational motion of the pickup arm coupler about, (a) a first axis substantially normal to, and (b) a second axis substantially in registry with, the pickup arm longitudinal axis when the coupling is in the assembled condition whereby the signal pickup maintains a specified attitude in the disc record spiral groove during playback.

BRIEF DESCRIPTION OF THE DRAWINGS

Other objects, features, and advantages of the present invention will be more fully understood from the following detailed description of the preferred embodiment, the appended claims, and the accompanying drawings in which:

FIGS. 3*a* and 3*b* illustrate respectively, a sectional elevation along line X—X in FIG. 2, and an end view of the support member of FIG. 2; and FIGS. 4*a* and 4*b* illustrate respectively, a sectional elevation along line X—X in FIG. 2, and an end view of the coupler of FIG. 2.

DETAILED DESCRIPTION OF THE PREFERRED EMBODIMENT

Figure 1:
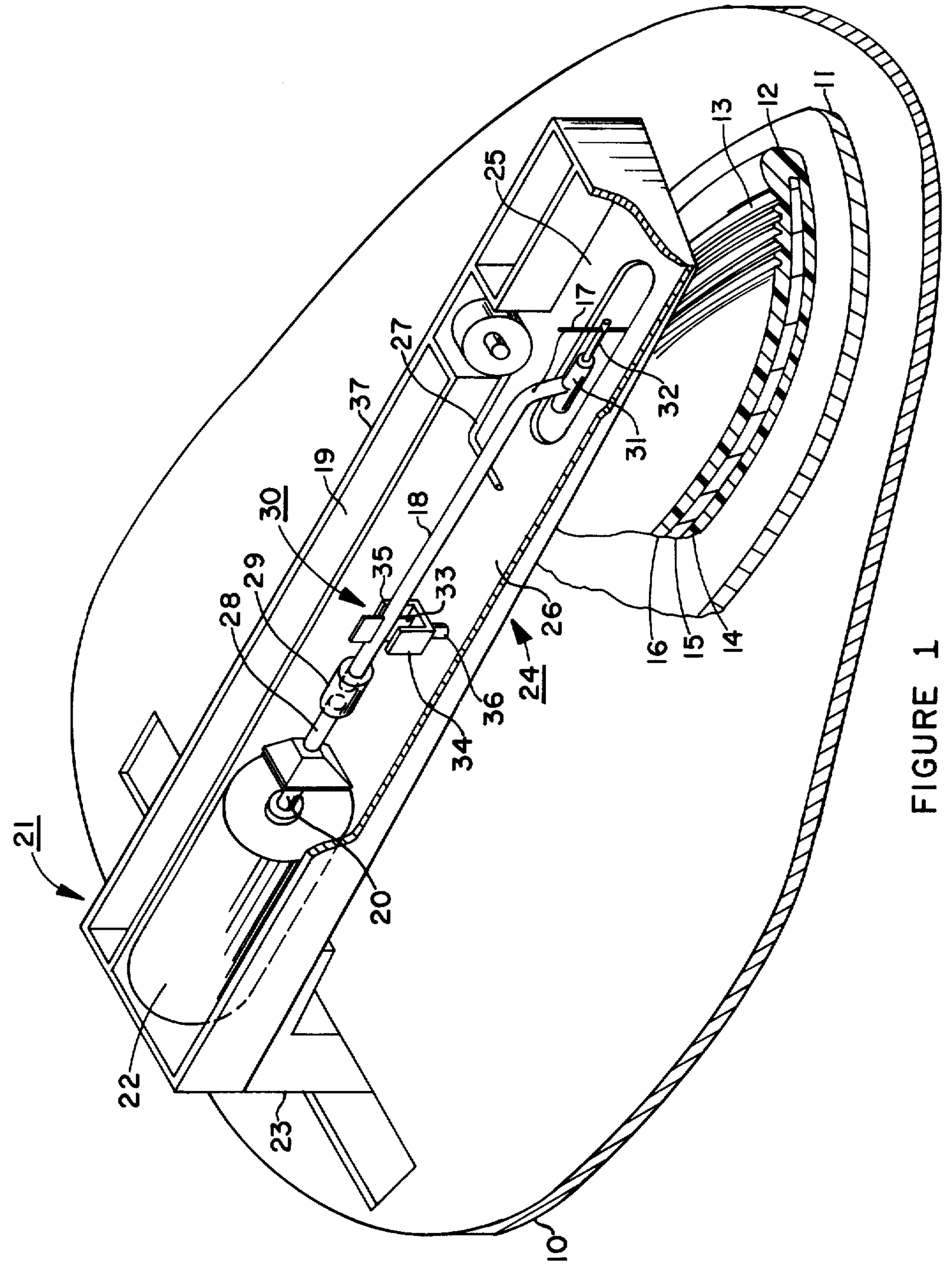
FIG. 1 is a partially cut-away perspective view of a video disc record player incorporating a preferred embodiment of a detachable pickup arm magnetic coupling of the present invention.

Referring to the drawings, wherein like reference numerals designate similar elements in the various views, in FIG. 1 a video disc player is shown having a turntable mounting plate 10. The player is suitable for use in a video disc system such as disclosed in the aforementioned Clemens' patent. A turntable 11 is rotatably mounted on the turntable mounting plate 10. The upper surface of the turntable 11 is adapted to support a video disc record 12. Video information is recorded by means of geometrical variations in the bottom of a smooth spiral groove 13 on the substrate 14 of the disc record 12. The disc record 12 surface includes a conductive coating 15 which is preferably covered with a thin deposit 16 of dielectric material. Although the disc record 12 is shown to have recording on one side only for the purpose of simplicity, it will be seen that the disc record may as well have recording on both sides. A signal pickup 17, supported by a pickup arm 18, engages the spiral groove 13 and includes a conductive electrode (not shown) which, together with the conductive coating 15 and the dielectric deposit 16, form a capacitor. When relative motion is established between the signal pickup 17 and the disc record 12, an edge of the electrode included in the signal pickup, while riding in the spiral groove 13, serves as an electrode of a capacitor varying due to the geometric variations in the bottom of a smooth spiral groove passing underneath. The other end of the pickup arm 18 is releasably secured by a coupler 28 to a support member 20 carried by a pickup arm supporting structure 21, in the manner to be described subsequently.

The pickup arm supporting structure 21 comprises a radial feed drive mechanism 23 and a translatory motion imparting means 22. As indicated before, the radial feed drive mechanism 23 traverses the pickup arm support member 20 in proper time relationship with the radial motion of the signal pickup 17 tip engaged in the spiral groove 13 so as to continuously maintain the longitudinal axis of the pickup arm substantially tangential to the spiral groove at the point of engagement. Reference may be made to the aforementioned copending Stave application Ser. No. 351,600) for an illustration of a suitable feed drive mechanism for providing the indicated radial motion.

As noted above, the translatory motion imparting means (also known as "armstretcher") varies the position of the signal pickup 17 along the disc record spiral groove 13 by imparting cyclical, translatory motion to the pickup arm along its longitudinal axis, via the support member 20, in a manner that opposes deviations of instantaneous relative speed from a predetermined speed. Illustratively, the translatory motion imparting means may be of the abovementioned Palmer type (U.S. Pat. No. 3,711,641).

A box-like, conductive cage 24 (shown with its lid removed for clarity) is mounted to the supporting structure 21 for enclosing the conductive pickup arm 18. During playback the pickup arm 18 passes through an opening 25 in the bottom wall 26 of the housing for permitting the signal pickup 17 to ride in the spiral groove 13. A pivotally mounted bracket 27 lifts the free end of the pickup arm 18 to disengage the signal pickup 17 from the spiral groove 13 when the player is inoperative.

Illustratively, the replaceable pickup arm unit may comprise a signal pickup holder 32 (carrying the signal pickup 17) pivoted by a compliant signal pickup holder support 31 to the pickup arm 18 free end. The compliant signal pickup holder support 31 rigidly transmits the cyclical, translatory motion of the pickup arm 18 to the signal pickup holder 32 while accommodating vertical and lateral, arcuate motion of the signal pickup 17 in the spiral groove. The compliant holder support 31, being located adjacent to the signal pickup signal 17, reduces the pickup arm unit mass which must follow the arcuate motion of the signal pickup, whereby the pickup arm unit compliance is enhanced.

A coupler 28 is secured to the pickup arm 18 end, remote from the signal pickup 17, by a compliant pickup arm support 29. The coupler 28 is releasably coupled to the support member 20 in the manner to be described subsequently. The compliant pickup arm support 29 also rigidly transmits the cyclical, translatory motion of the coupler 28 to the pickup arm 18 while decoupling the coupler (subject to engagement with the support member 20) from arcuate motion of the pickup arm.

An end of the conductive pickup arm, remote from the pickup arm support 29, is connected to the signal pickup electrode by any suitable means. In the illustration, respective ends of a lead are soldered to the conductive pickup arm 18 remote end and the signal pickup 17 electrode. The conductive first end portion and the surrounding conductive cage serve respectively as an inner and outer conductor of a transmission line. The transmission line is capacity end loaded at both ends: (1) at the signal pickup 17 end by a variable capacitance corresponding to the series combination comprising (a) the varying capacitance established between the signal pickup electrode and the disc record conductive coating 15, and (b) the larger capacitance exhibited between the bottom of the conductive cage 24 and the disc record conductive coating overshadowed by the cage; and (2) at the pickup arm support 20 end by the series combination including (a) an air dielectric capacitor 30, and (b) the voltage variable capacitor (not shown).

The air dielectric capacitor 30 includes a movable capacitor plate 33, suspended from the pickup arm 18, received in an air gap between a pair of fixed capacitor plates (34 and 35) fixedly mounted to the conductive cage bottom surface 26 by an insulator post 36. The air dielectric capacitor 30 meets the transmission line's capacity end loading requirements without the need for a wired connection between the pickup arm 18 and the cage 24. Ability to quickly and easily remove the replaceable pickup arm unit from the cage is thus established.

The transmission line and the associated capacitances establish a tuned circuit with resonant frequency subject to variation as the signal pickup electrode/disc record conductive coating capacitance varies. The tuned circuit is excited with UHF oscillations from a fixed frequency oscillator (not shown) of the signal processing circuit 19 enclosed in a cage compartment 37 operating at a frequency (e.g., 915 MHz) within an ISM-allocated band. As the resonant frequency of the tuned circuit varies, the resultant amplitude variations are detected by a detector of a signal processing circuitry 19 to recover the prerecorded information. Reference may be made to the copending U.S. application of D. J. Carlson et al., Ser. No. 454,103, filed Mar. 14, 1974, now U.S. Pat. No. 3,872,240 and entitled, "PICKUP APPARATUS FOR VIDEO DISC PLAYERS," for a more detailed description of circuitry appropriate to the aforesaid purpose.

Figure 2:
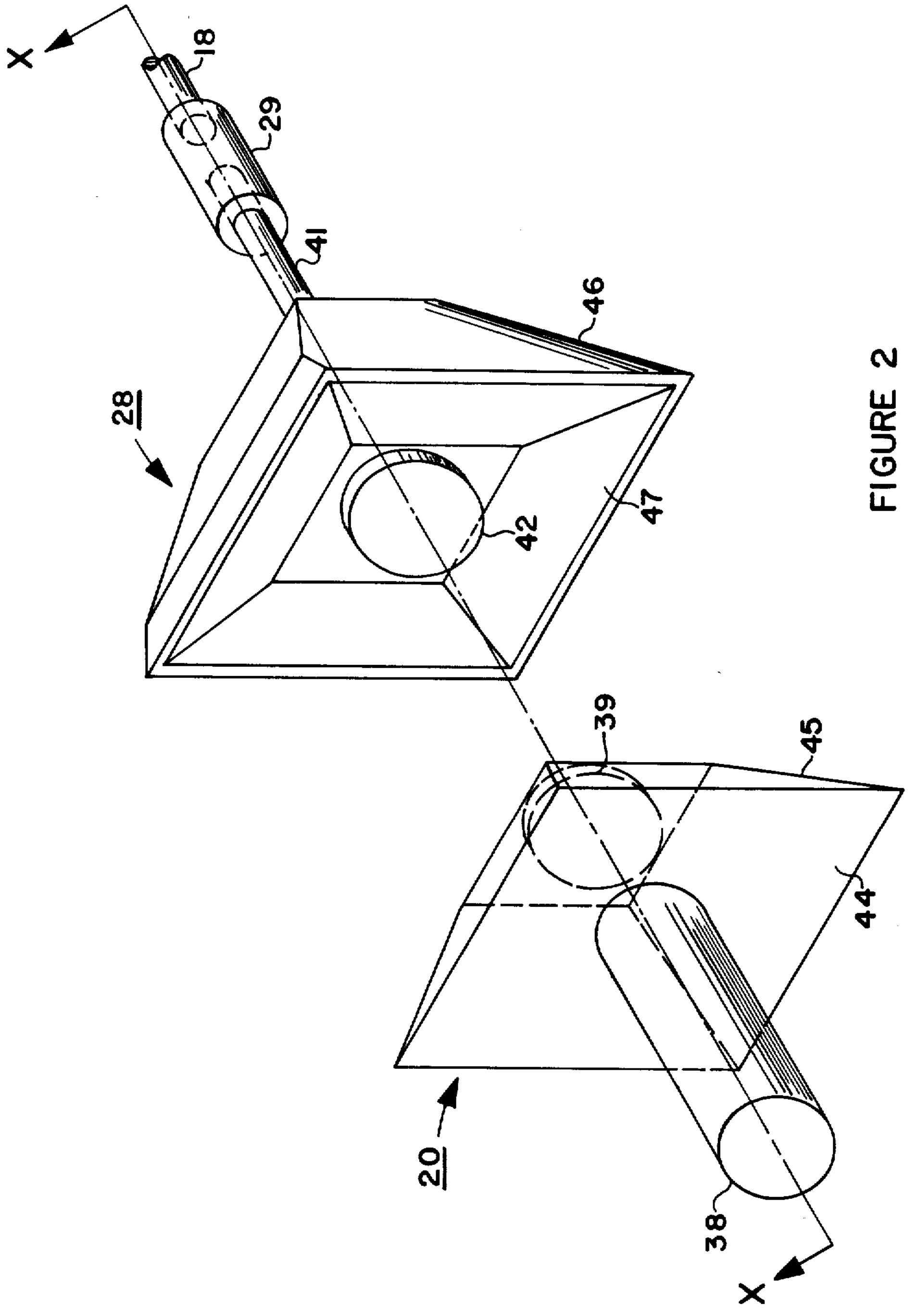
FIG. 2 is an exaggerated perspective view of the detachable pickup arm magnetic coupling of FIG. 1 illustrating a support member and a coupler which is secured to a pickup arm.

The detachable magnetic pickup arm coupling will now be described in detail with reference to FIGS. 2, 3*a*, 3*b*, 4*a* and 4*b*. FIG. 2 represents a perspective view of the coupling including the support member 20 and the coupler 28. FIGS. 3*a* and 3*b* illustrate, respectively, a sectional elevation and an end view of the support member 20. FIGS. 4*a* and 4*b* depict, respectively, a sectional elevation and an end view of the coupler 28.

The support member 20 has a shank portion 38 which is fixedly secured to the translatory motion imparting means 32 transducer by any suitable means. In the preferred embodiment, the shank portion 38 is epoxy bonded to the transducer. A disc 39, made from magnetizable material (a first magnetic coupling element) is permanently affixed to the support member 20 by any suitable means. In the preferred embodiment, a circular recess 40 (FIG. 3a) is provided in the support member 20 for the purpose of aligning the axes of the disc 39 and the support member. The disc 39 is epoxy bonded to the support member 20.

The coupler 28 has a shaft portion 41 which is fixedly secured to the pickup arm 18 by any suitable means. In the preferred embodiment a tubular pickup arm support 29 securely receives the respective ends of the coupler shaft 41 and the pickup arm 18 as shown more clearly in FIG. 2. A disc 42 made from magnetized material (a second magnetic coupling element) is permanently secured to the coupler 28 by any suitable means. In the preferred embodiment, a circular recess 43 (FIG. 4*a*) is provided in the coupler 28 for the purpose of aligning the axes of the disc 42 and the coupler. The disc 42 is epoxy bonded to the coupler 28. In the preferred embodiment, the support member 20 and the coupler 28 are made from diamagnetic material (e.g., molded plastic).

The engagement of the coupler magnetized disc 42 with the support member magnetizable disc 39 rigidly transmits the longitudinal motion of the translatory motion imparting means 22 to the pickup arm 18 during playback. It is also apparent that the support member magnetizable disc 39 and the coupler magnetized disc 42 may be interchanged and yet the coupling would be an effective operation.

Guide means are secured to the support member 20 and the coupler 28 (1) for establishing a rotational orientation of the pickup arm during engagement of the coupling elements, and (2) for prohibiting any rotational motion of the pickup arm coupler in relation to the support member about (a) a first set of axes substantially normal to, and (b) a second axis substantially in registry with, the pickup arm 18 longitudinal axis whereby the signal pickup 17 maintains a specified attitude in the spiral groove during playback. In the preferred embodiment, a male part 44 is integrally provided with the support member 20 and has a region 45 with a monotonously decreasing cross section. The region 45 comprises a frustum of a pyramid. A female part 46 is integrally provided with the coupler 28 and has a complementary cavity 47 in which the male part region 45 is seated when the coupling is in an assembled condition.

The male part region 45 and the female part cavity 47 have dimensions and configuration that permits the engagement of the coupler magnetized disc 42 with the support member magnetizable disc 39 while prohibiting the rotational motion of the pickup arm coupler 28 in relation to the support member 20 during playback when the coupling is in the assembled condition.

Thus, the detachable pickup arm magnetic coupling has the following features. First, the coupling rigidly transmits the longitudinal motion of the translatory motion imparting means to the pickup arm. Second, the coupling maintains a specified attitude of the signal pickup in the disc record spiral groove during playback. Third, the coupling permits a simple disconnection and connection between the pickup arm and the player supporting structure, whereby the unskilled consumer replacement of the pickup arm unit becomes practical.

What is claimed is:

1. In a playback system for recovering prerecorded information from a spirally grooved disc record rotatably mounted on a turntable by a signal pickup when relative speed is established therebetween, wherein it is desirable that the signal pickup maintain a specified attitude with respect to the spiral groove during playback; the playback system including a pickup arm carrying the signal pickup, and a pickup arm supporting structure having means for imparting translatory motion to the signal pickup along the longitudinal axis of the pickup arm in a manner that opposes deviations of the relative speed from a predetermined speed; a detachable pickup arm magnetic coupling comprising:

means, fixedly secured to the translatory motion imparting means, for supporting a first magnetic coupling element of magnetizable material;

a coupler secured to an end of the pickup arm remote from the signal pickup and including a second magnetic coupling element of magnetizable material which is subject to releasable engagement with the first magnetic coupling element when the pickup arm magnetic coupling is in an assembled condition, wherein at least one of the first and the second magnetic coupling elements is permanently magnetized, and wherein the engagement of the first and the second magnetic coupling elements permits rigid transmission of the longitudinal motion of the translatory motion imparting means to the pickup arm via the coupler; and guide means secured to the support means and the coupler, (1) for establishing a rotational orientation of the pickup arm during engagement of the coupling elements, and (2) for prohibiting any rotational motion of the pickup arm coupler in relation to the support member about, (a) a first axis substantially normal to, and (b) a second axis substantially in registry with, the pickup arm longitudinal axis when the coupling is in the assembled condition whereby the signal pickup maintains a specified attitude in the spiral groove during playback.

2. A system as defined in claim 1 wherein the guide means comprise:

a male part having one end secured to the support means and having a region remote from the one end with a monotonously decreasing cross section;

a female part secured to the coupler and having a complementary cavity in which the male part region is received when the coupling is in the assembled condition; and wherein the male part region and the female part cavity have dimensions and surface configuration that permits the engagement of the first and the second magnetic coupling elements while prohibiting any rotational motion of the pickup arm coupler in relation to the support means when the coupling is in the assembled condition.

3. A system as defined in claim 2 wherein the surface of the male part in the region comprises a frustum of a pyramid having peripheral surfaces which define at least one linear edge substantially parallel to the pickup arm longitudinal axis and wherein the female part cavity has a complementary recess whereby the specified attitude of the signal pickup in the spiral groove during playback is achieved.

4. A system as defined in claim 3 wherein the frustum has a rectangular cross section.

* * * * *